(12) United States Patent
Kear et al.

(10) Patent No.: US 7,640,111 B2
(45) Date of Patent: Dec. 29, 2009

(54) METHOD AND SYSTEM FOR INTERPRETING BOREHOLE GEOLOGICAL DATA

(75) Inventors: George R. Kear, Slidell, LA (US); Anish Kumar, Katy, TX (US); David Williamson, Missouri City, TX (US); Gamal E. Shehab, Heliopolis (EG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/780,372

(22) Filed: Jul. 19, 2007

(65) Prior Publication Data

US 2008/0021653 A1    Jan. 24, 2008

Related U.S. Application Data

(60) Provisional application No. 60/832,323, filed on Jul. 21, 2006.

(51) Int. Cl.
*G01V 1/40* (2006.01)
*G01V 1/00* (2006.01)

(52) U.S. Cl. .......................................... 702/10; 367/53

(58) Field of Classification Search .................... 702/10, 702/1, 2, 11, 14; 367/25, 33, 47, 53; 33/304
See application file for complete search history.

(56) References Cited

U.S. PATENT DOCUMENTS

| | | | |
|---|---|---|---|
| 4,414,656 A * | 11/1983 | Hepp | 367/25 |
| 4,646,240 A | 2/1987 | Serra et al. | |
| 4,698,759 A * | 10/1987 | Eliason et al. | 702/5 |
| 4,791,618 A | 12/1988 | Pruchnik | |
| 4,853,855 A | 8/1989 | Kerzner | |
| 4,939,648 A | 7/1990 | O'Neill et al. | |
| 5,274,572 A | 12/1993 | O'Neill et al. | |
| 6,751,557 B1 | 6/2004 | Shehab et al. | |

(Continued)

FOREIGN PATENT DOCUMENTS

JP    06-101395    4/1994

(Continued)

OTHER PUBLICATIONS

Gilreath, J.A.; "Dipmeter Interpretation Rules"; The Technical Review, Schlumberger Education Services, 1987; 8 pages.

(Continued)

*Primary Examiner*—Michael P. Nghiem
*Assistant Examiner*—Toan M Le

(57) ABSTRACT

Computer-based method and system are disclosed for interpreting dips, dip trends, and mineral based lithofacies data to identify certain geological events in a subsurface formation. The disclosed method/system analyzes dip magnitude and azimuth data to determine the dip trends in the formation. The dip trends are then examined for indications of the presence of certain depositional events, such as build-ups, flow directions instances of scour and fill, direction to thalweg, parallel bedding, indications of fault, and the like. If lithofacies data is available the disclosed method/system can also analyze this data to identify the presence of interbedded sequences and condensed sections. Such an integrated solution saves geoscientists and interpreters an enormous amount of time compared to existing interpretation techniques, allowing them to be much more productive. The disclosed system/method may also be used to help train new and less experienced geoscientists and interpreters.

18 Claims, 10 Drawing Sheets

U.S. PATENT DOCUMENTS

| | | | |
|---|---|---|---|
| 7,379,854 B2 * | 5/2008 | Calvert et al. | ................ 703/10 |
| 2002/0180728 A1 | 12/2002 | Neff et al. | |
| 2004/0225441 A1 | 11/2004 | Tilke et al. | |

FOREIGN PATENT DOCUMENTS

| | | |
|---|---|---|
| KR | 10-20030009780 | 2/2003 |
| KR | 10-20060031668 | 4/2006 |
| WO | 2004-090286 | 10/2004 |

OTHER PUBLICATIONS

English Patent Abstract of KR20030009780 from esp@cenet, Published Feb. 5, 2003 (1 Page).

English Patent Abstract of JP6101395 from esp@cenet, Published Apr. 12, 1994 (1 Page).

International Search Report issued in PCT/US2007/074034, Dated Nov. 27, 2007, (3 Pages).

* cited by examiner

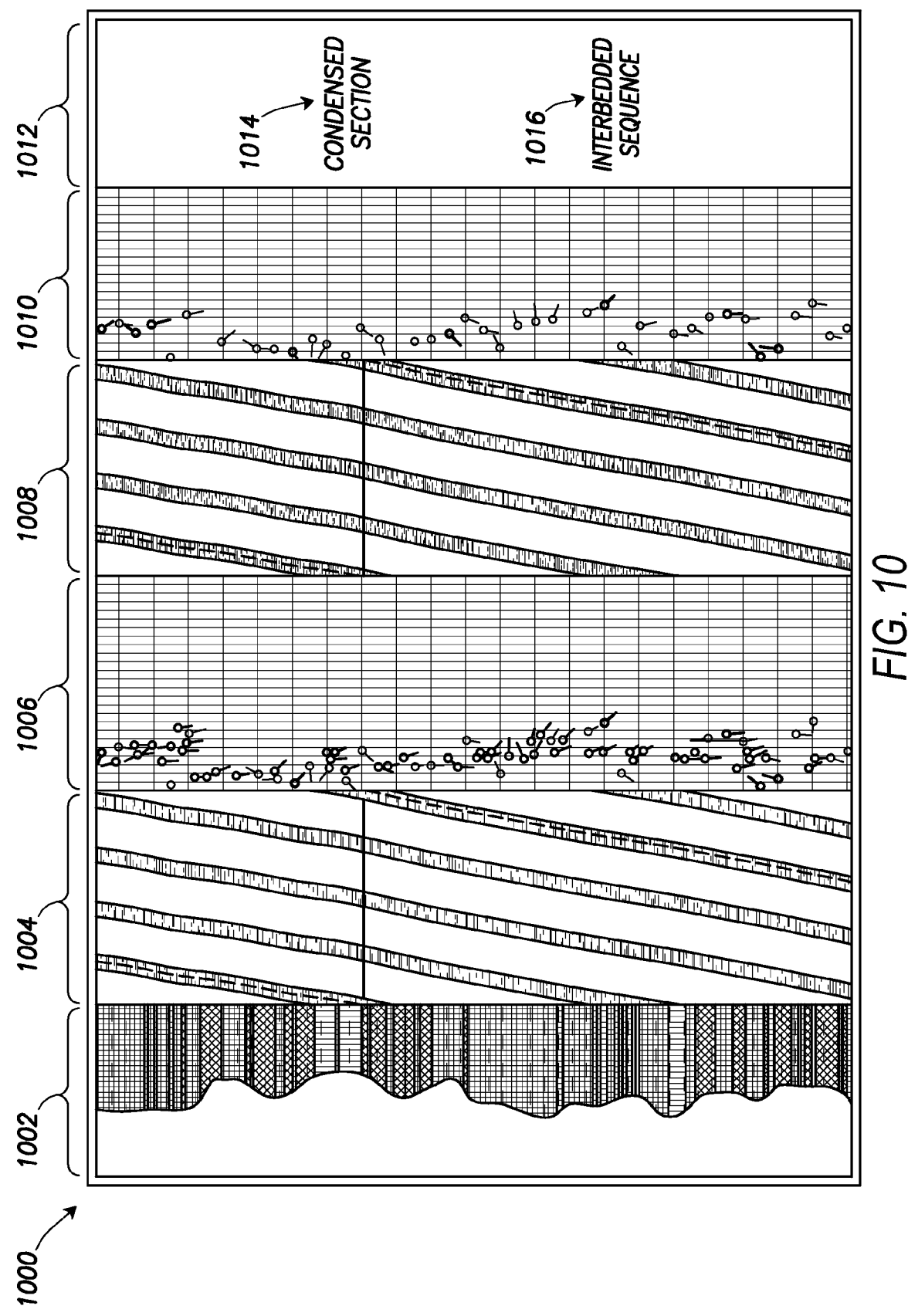

METHOD AND SYSTEM FOR INTERPRETING BOREHOLE GEOLOGICAL DATA

CROSS-REFERENCE TO RELATED APPLICATIONS

This application claims benefit of U.S. Provisional Application Serial No. 60/832,323 entitled "Method and System for Interpreting Borehole Geological Data," filed on Jul. 21, 2006, now expired, in the names of George R. Kear, Anish Kumar, David Williamson, and Gamal Shehab.

FIELD OF THE INVENTION

The present invention relates generally to the interpretation of geological data from a subsurface formation and more particularly to a computer-based method and system for interpreting dips, dip trends and lithofacies data to identify and analyze certain geological events and features in the subsurface formation.

BACKGROUND

In geology, a "dip" refers to the magnitude and azimuth of inclination of a plane relative to a horizontal plane. The dips of bedding planes within a section of the formation define a dip pattern or trend. Such dip patterns or trends are useful in geological interpretations, which are in turn very important in the petroleum industry for a proper understanding of the properties and characteristics of the various oil and gas reservoirs and for accurate modeling and simulating of the reservoirs.

The dip trends in a subsurface formation are interpreted largely based on borehole geological (dipmeter and image) log data. A number of advanced devices and sensors have been developed to facilitate the acquisition of such borehole geological log data. Oil-based mud imagers (OBMI™), full-bore formation micro imagers (FMI™), and other advanced devices can provide fast and high-resolution images of the borehole and/or measurements to compute dips. These borehole geological devices make it possible to perform geological, structural, and stratigraphic interpretations, including thin-bed detection, compartmentalization delineation, high-resolution net-pay calculations and well correlations.

In addition, the inventors of the present invention have co-invented a patented rock classification system called iCore™. The iCore™ rock classification system, available from Schlumberger Oilfield Services, Inc., uses a Ternary Diagram model and a set of classification rules to classify the rock data obtained from a borehole spectroscopy tool. Borehole spectroscopy tools provide data to compute total dry weight percentages of the QFM (quartz, feldspar, and mica), clay, carbonate, pyrite, siderite, anhydrite, coal, and salt in the formation. Based on the set of rules, the iCore™ system determines whether the rock data represents marl, claystone, shale, sandy shale, shaly sand, sand, clean sand, calcareous sand, calcareous shale, carbonate, sandy carbonate, or shaly carbonates. Such a rock classification system has greatly helped improve geological interpretations. For more information regarding the iCore™ rock classification system, the reader is referred to commonly assigned U.S. Pat. No. 6,751,557, entitled "Rock Classification Method and Apparatus," issued on Jun. 15, 2004, and incorporated herein by reference in its entirety.

While the above tools are useful and provide very accurate data regarding the borehole geology, the dip trend recognition and interpretation process has heretofore remained a largely manual process. This process generally calls for geoscientists and interpreters to manually examine (i.e., view) the borehole geological log data, identify the individual dips, study the dip trends, and make a geological interpretation. Such a process, however, requires an exceedingly large amount of time when thousands of feet of borehole image log data are involved, as is often the case in the petroleum industry. Accordingly, what is needed is a way to automate the dip trend interpretation process as much as possible in order to reduce the amount of time required by geoscientists and interpreters.

SUMMARY

The present invention is directed to a computer-based method and system for interpreting dips, dip trends, and mineral based lithofacies data to identify certain geological events in a subsurface formation. The method/system of the invention analyzes dip magnitude and azimuth data to determine the dip trends in the formation. The dip trends are then examined for indications of the presence of certain depositional events, such as build-ups, flow directions, instances of scour and fill, direction to thalweg, parallel bedding, indications of fault, and the like. If lithofacies data is available, the method/system of the invention can also analyze this data to identify the presence of interbedded sequences and condensed sections. Such an integrated solution saves geoscientists and interpreters an enormous amount of time compared to existing interpretation techniques, allowing them to be much more productive. The system/method of the invention may also be used to help train new and less experienced geoscientists and interpreters.

In general, in one aspect, the invention is directed to a computer-based method for processing a plurality of dips in a portion of a subsurface formation. The method comprises receiving a consecutiveness threshold to be applied to the dips and determining whether the dips have consecutiveness based on the consecutiveness threshold. The method further comprises identifying and analyzing one or more geological events from the dips having consecutiveness and displaying dip trend information for the dips having consecutiveness based on the identified geological events.

In general, in another aspect, the invention is directed to a computer-based system for processing a plurality of dips in a portion of a subsurface formation. The system comprises a processor, a system bus connected to the processor, and a storage medium connected to the system bus. The storage medium has computer-readable instructions stored thereon for causing the processor to receive a consecutiveness threshold to be applied to the dips and determine whether the dips have consecutiveness based on the consecutiveness threshold. The computer-readable instructions further cause the processor to identify and analyze one or more geological events from the dips having consecutiveness and generate dip trend information for the dips having consecutiveness based on the identified geological events.

In general, in yet another aspect, the invention is directed to a computer-based method for processing mineral based lithofacies data in a portion of a subsurface formation. The method comprises receiving the mineral based lithofacies data, identifying and analyzing one or more depositional events from the mineral based lithofacies data, and displaying depositional event information for the identified depositional events.

In general, in still another aspect, the invention is directed to a computer-based system for processing mineral based lithofacies data in a portion of a subsurface formation. The system comprises a processor, a system bus connected to the processor, and a storage medium connected to the system bus. The storage medium has computer-readable instructions stored thereon for causing the processor to receive the mineral based lithofacies data, identify and analyze one or more depositional events from the mineral based lithofacies data, and display depositional event information for the identified depositional events.

In general, in yet another aspect, the invention is directed to a computer-based method for processing geological data in a portion of a subsurface formation. The method comprises receiving data representing a plurality of dips and receiving a consecutiveness threshold to be applied to the plurality of dips. The method further comprises determining whether the dips have consecutiveness based on the consecutiveness threshold, and identifying and analyzing one or more geological events from the dips having consecutiveness. The geological events include at least one of upward decreasing magnitude bedding, upward increasing magnitude bedding, flow direction, scour and fill event, indication of fault, and direction to thalweg. Where mineral based lithofacies data is available, the method further comprises receiving the mineral based lithofacies data, and identifying and analyzing one or more depositional events from the mineral based lithofacies data. The depositional events include at least one of an interbedded sequence and a possible condensed section. Dip trend information is generated and available for display with the dips based on the identified geological events and the depositional events.

Other aspects of the invention will be apparent from the following description and the appended claims.

BRIEF DESCRIPTION OF DRAWINGS

FIG. 10 illustrates a portion of an exemplary presentation showing the interbedded sequences and condensed sections according to embodiments of the invention.

DETAILED DESCRIPTION

As mentioned above, existing dip trend interpretations require geoscientists and interpreters to manually examine borehole geological log data and identify the individual dips and dip trends. Embodiments of the invention provide a computer-based method and system for automatically processing dip data to identify and analyze the dip trends and patterns. Following is a detailed description of exemplary embodiments of the invention, as illustrated by the drawings.

Figure 1:
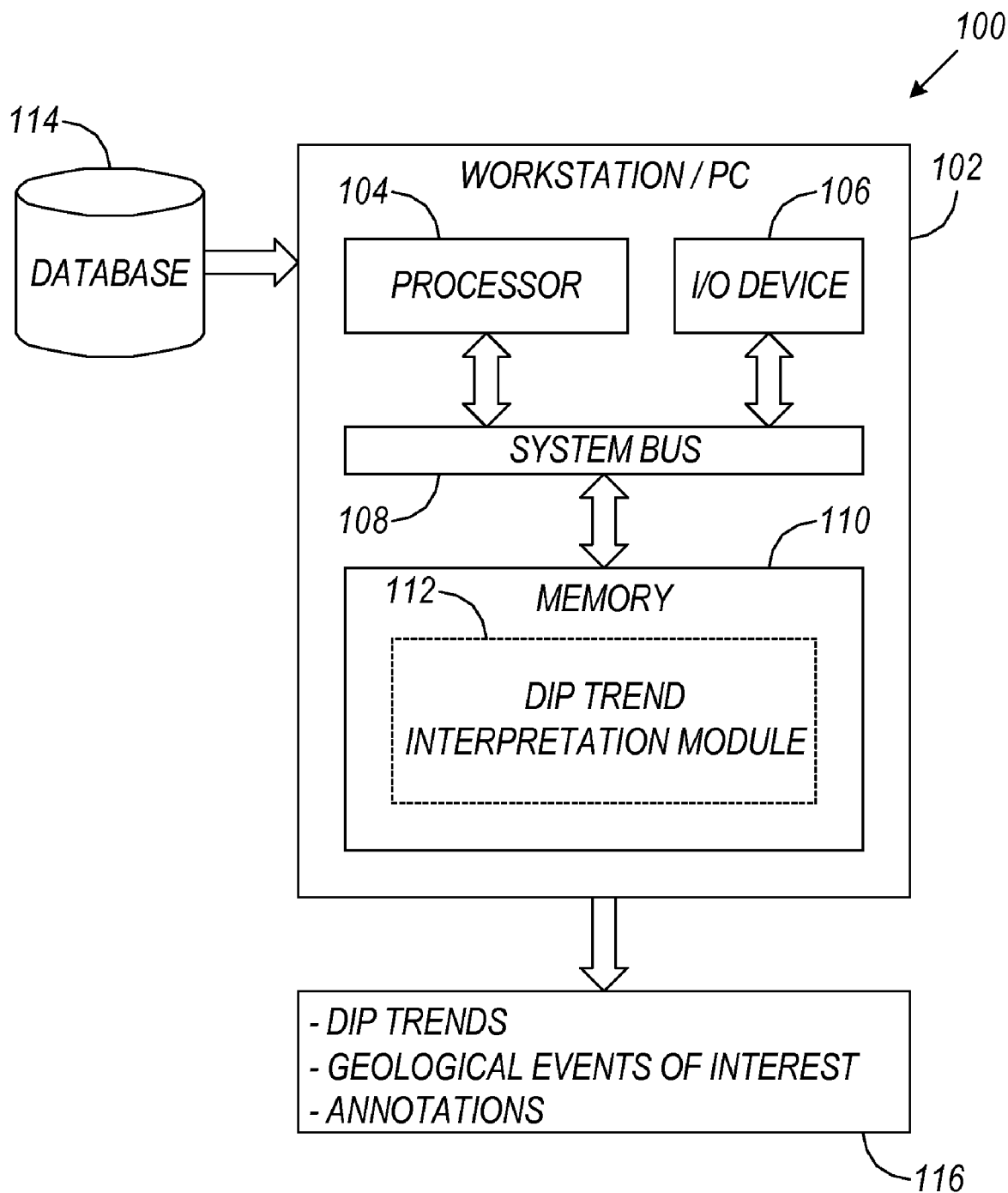
FIG. 1 illustrates an exemplary system that may be used to interpret dip trends according to embodiments of the invention.

Referring to FIG. 1, a system 100 for interpreting dip patterns or trends according to embodiments of the invention is shown. The system 100 includes, among other things, a workstation 102, which may be a stand alone personal computer (PC), a workstation (e.g., a Unix-based Sun Microsystems workstation), two or more networked workstations, a mainframe computer, and the like. In one embodiment, the workstation 102 has a number of functional components, including at least one processor 104, an input/output (I/O) unit 106, a system bus 108, and a computer-readable system memory 110. These components of the workstation 102 are generally well known to those having ordinary skill in the art and therefore will not be described in great detail here. Furthermore, although multiple discrete components are shown in FIG. 1, those having ordinary skill in the art will understand that two or more of these components may be combined into a single component, and that a single component may be divided into several sub-components, as needed. Also present are a dip trend interpretation module 112 for recognizing and interpreting the dip trends in the subsurface formation, a database 114 for storing data used by the dip trend interpretation module 112, and a display 116 for displaying information generated by the dip trend interpretation module 112.

Briefly, the processor 104 is responsible for the overall operation of the workstation 102, including executing of the operating system software and any other software applications that may be present on the workstation 102. The I/O unit 106 controls the flow of data into and out of the workstation 102, for example, through various media reader devices and output devices. The system bus 108 allows the various functional components of the workstation 102 to communicate and exchange data with one another. Finally, the system memory 110, which may be a magnetic, optical, and/or semiconductor memory, provides temporary and long-term storage for any information or data needed by the operating system and applications running on the workstation 102.

In accordance with embodiments of the invention, the dip trend interpretation module 112 is stored on the system memory 110 for recognizing and interpreting the dip trends in a subsurface formation. The dip trend interpretation module 112 uses data that is composed of a series of individual dips selected by the geoscientist/user. By way of background information, the dips are derived beforehand from borehole geological log data using one of several available software applications (e.g., GeoFrame™ BorView™, BorDip™, DipRemoval™, etc.). Some of these software applications are specifically designed to automatically process the borehole geological log data and generate a series of dips therefrom. Because the software tends to be overly inclusive, the initial set of dips is usually reviewed by a geoscientist in order to pick out the accurate dips from those that may not be considered to be actual dips or representative of real events and surfaces in the subsurface formation. Additionally dips may be hand picked by the geoscientist/user by visual inspection of the images and identification of dips and bedding interfaces. The selected dips, including the depths, magnitudes, and azimuths therefor, are then stored in the database 114 for subsequent processing.

After the dip data is loaded into the workstation 102, it needs to be processed for structure deletion prior to dip trend or pattern recognition and interpretation. A structure deleted dip, as understood by those having ordinary skill in the art, is a dip that has been compensated for structural changes that may have taken place in the subsurface formation over time. The structure deleted dip is essentially a computation of the dip as it was when the subsurface formation was originally laid down. A number of software applications, such as GeoFrame™ DipRemoval™ are available for performing the structure deletion.

One method for performing structural dip deletion is discussed below. Once the dip data is made available, the next step is to determine the structural dip using these dips. Determining the structural dip may be performed in keeping with the Law of Original Horizontality, which may be defined as sedimentary strata deposited on nearly horizontal surfaces and essentially parallel to the surface on which they accumulate. Specifically, determining the structural dip may be performed by examining the dips in shale formations or other quiet energy environments from the borehole microresistivity data and images and computing a mean dip to represent structural dip over a section of interest. Where needed, the structural dip is vector-subtracted from all the true dips to simulate or best approximate the dips that existed in the strata at the time of deposition. Structural deletion, in the process discussed above, is able to simulate very flat (horizontal) dips in the shale formations, and also computes dips in the sand formations as the dips existed at the time of deposition. These dips can be referred to as stratigraphic dips. Interpretation of the stratigraphic dips may be used to determine flow directions, flow trends, energy of deposition and depositional environments. The resulting structure deleted dips are then placed in database 114.

Because the dips in the database 114 may have unevenly spaced depths, especially if they have been manually picked by a geoscientist, the dip data may result in an irregular data sampling rate. Such an irregular data sampling rate may make it difficult to load the dip data into the workstation 102 and the software applications that are running on the workstation 102. Various procedures may optionally be performed to correct the irregular data sampling rate. The following is a discussion of one way to mitigate the effects of an irregular data sampling rate using a data handling procedure. One way is to force the software application to sample the data at an arbitrary, but sufficiently high sample rate. This can be done for software applications that are designed using certain application builder software, for example, GeoFrame™ Application Builder software from GeoQuest, which is a Schlumberger company. Application builder software such as GeoFrame™ Application Builder allows the programmer to control the input and output sample rate for all data. The programmer may then set the sampling rate of the software application at an appropriate level.

The incoming data may also be monitored so that no data points are read twice. In one example, the depth of the most previously loaded data point may be checked against the depth of the current data point. If these two depths are within a certain distance from each other, as may be determined by those having ordinary skill in art, the associated dips can be considered duplicates and therefore the current data point should be discounted. Once all the data points are read, the programmer may set the internal sampling rate of the software application to a more desirable rate.

The above is a discussion of only one way to mitigate the effects of irregular data sampling rate. If required, alternative data handling procedures (or no additional data handling procedure at all) may also be performed.

Upon obtaining the finalized structure deleted dip data, the workstation 102 executes the dip interpretation module 112 to interpret the dip trends. The dip trend interpretation module 112 may use standard and/or proprietary dip trend interpretation rules to look for indications of certain geological events from the dip data, including consecutiveness, build-ups, flow directions, instances of scour and fill, direction to thalweg, parallel bedding, indications of fault, and the like. The dip trend interpretation module 112 thereafter presents the output of the interpretations, including the dip trends, annotations therefor, and identification of certain geological events on the display 116 or other suitable medium.

Figure 2:
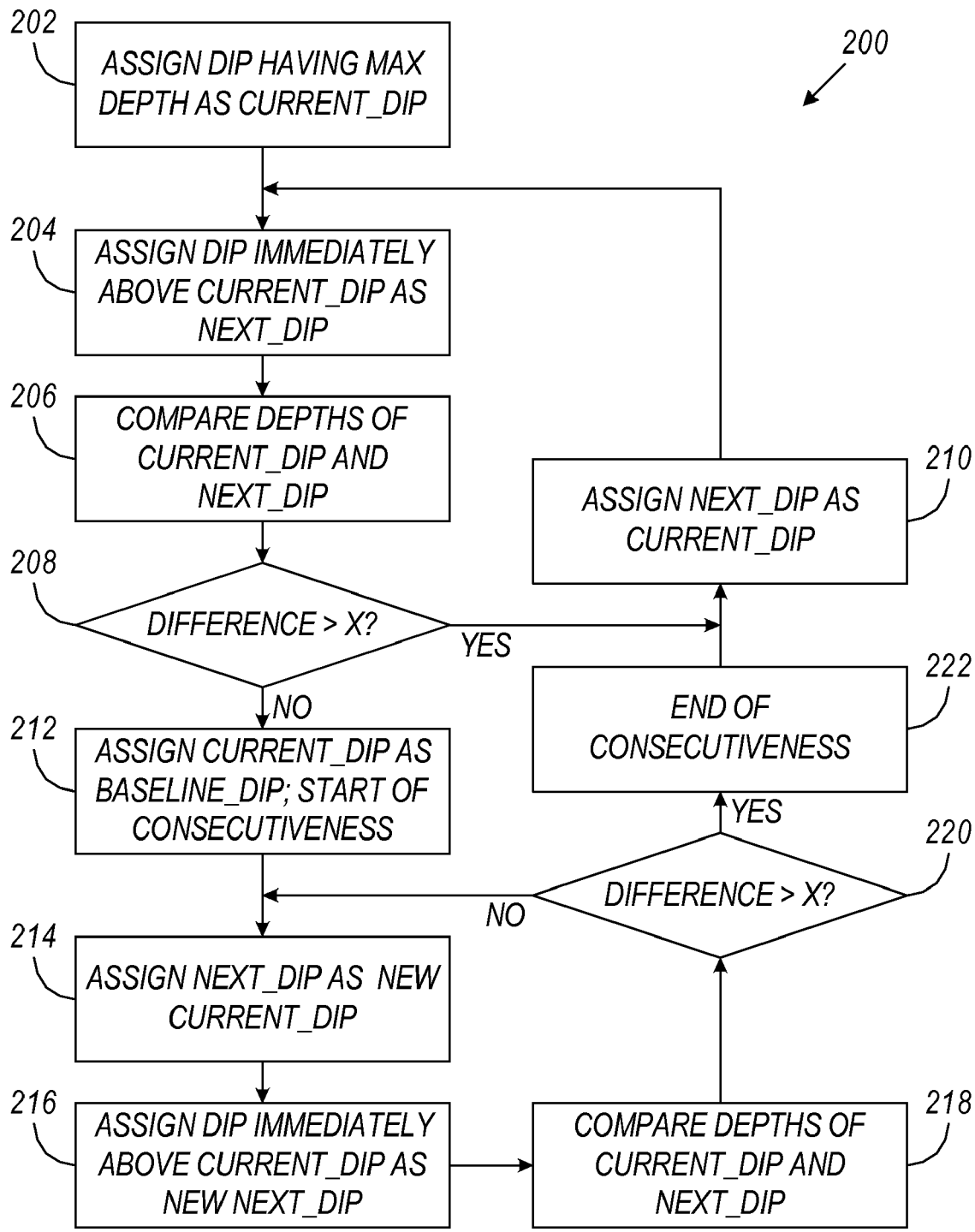
FIG. 2 illustrates an exemplary method for detecting consecutiveness according to embodiments of the invention.

Operation of the dip trend interpretation module 112 according to some embodiments of the invention will now be described with respect to FIGS. 2-5. As mentioned above, the dip trend interpretation module 112 may be used to determine whether the dips have consecutiveness. The term "consecutiveness," as used by those having ordinary skill in the art, refers to the vertical proximity of the dips to one another and hence inherent depositional relationship. Thus, two dips are considered to have consecutiveness if they are within a certain vertical threshold of one another, such threshold being determinable by those having ordinary skill in the art. The vertical threshold may be defined by the geoscientist/user and changed as needed for a particular subsurface formation. FIG. 2 illustrates an exemplary method that may be used by the dip trend interpretation module 112 to determine whether two or more dips have consecutiveness.

As can be seen in FIG. 2, a method 200 for determining consecutiveness begins at step 202, where the dip having the maximum depth is assigned as the dip currently being considered, denoted as a variable "current_dip" herein. Note that the same variable notation scheme is used throughout the figures. The dip immediately above "current_dip" is then assigned as "next_dip" at step 204, and the depths of "current_dip" and "next_dip" are compared at step 206. At step 208, a determination is made as to whether the difference in depth between "current_dip" and "next_dip" is greater than a predefined threshold "X," which may be chosen by the geoscientist/user based on the particular formation being considered and may be changed as needed.

If the difference in depth between "current_dip" and "next_dip" is greater than the predefined threshold "X," then there is no consecutiveness between the two dips and "next_dip" is assigned as the new "current_dip" at step 210. The method 200 thereafter returns to step 204, where the dip immediately above the new "current_dip" is assigned as the new "next_dip," and another comparison is performed.

On the other hand, if in step 208, the difference in depth between "current_dip" and "next_dip" is not greater than the predefined threshold "X," then there is consecutiveness between the two dips. Since this would be the first instance of consecutiveness, it constitutes the beginning of the consecutiveness. Thus, at step 212, "current_dip" is assigned as "baseline_dip" to indicate the start of the consecutiveness. At step 214, "next_dip" is then assigned as the new "current_dip," and at step 216, the dip immediately above the new "current_dip" is assigned as the new "next_dip."

A comparison of the depths of "current_dip" and "next_dip" is made at step 218 and a determination is made at step 220 as to whether the difference is greater than the predefined threshold "X." If the difference is not greater than the predefined threshold "X," then there is consecutiveness, and the method 200 returns to step 214, where "next_dip" is assigned as the new "current_dip." The dip immediately above "current_dip" is then assigned as the new "next_dip" at step 216, and the comparison is repeated at step 218. On the other hand, if in step 220 the difference between "current_dip" and "next_dip" turns out to be greater than the predefined threshold "X," then the consecutiveness has ended and the method 200 proceeds to step 222 to record the end of the consecutiveness. The method 200 thereafter returns to step 210 to begin the procedure again for dips further upward.

Figure 3:
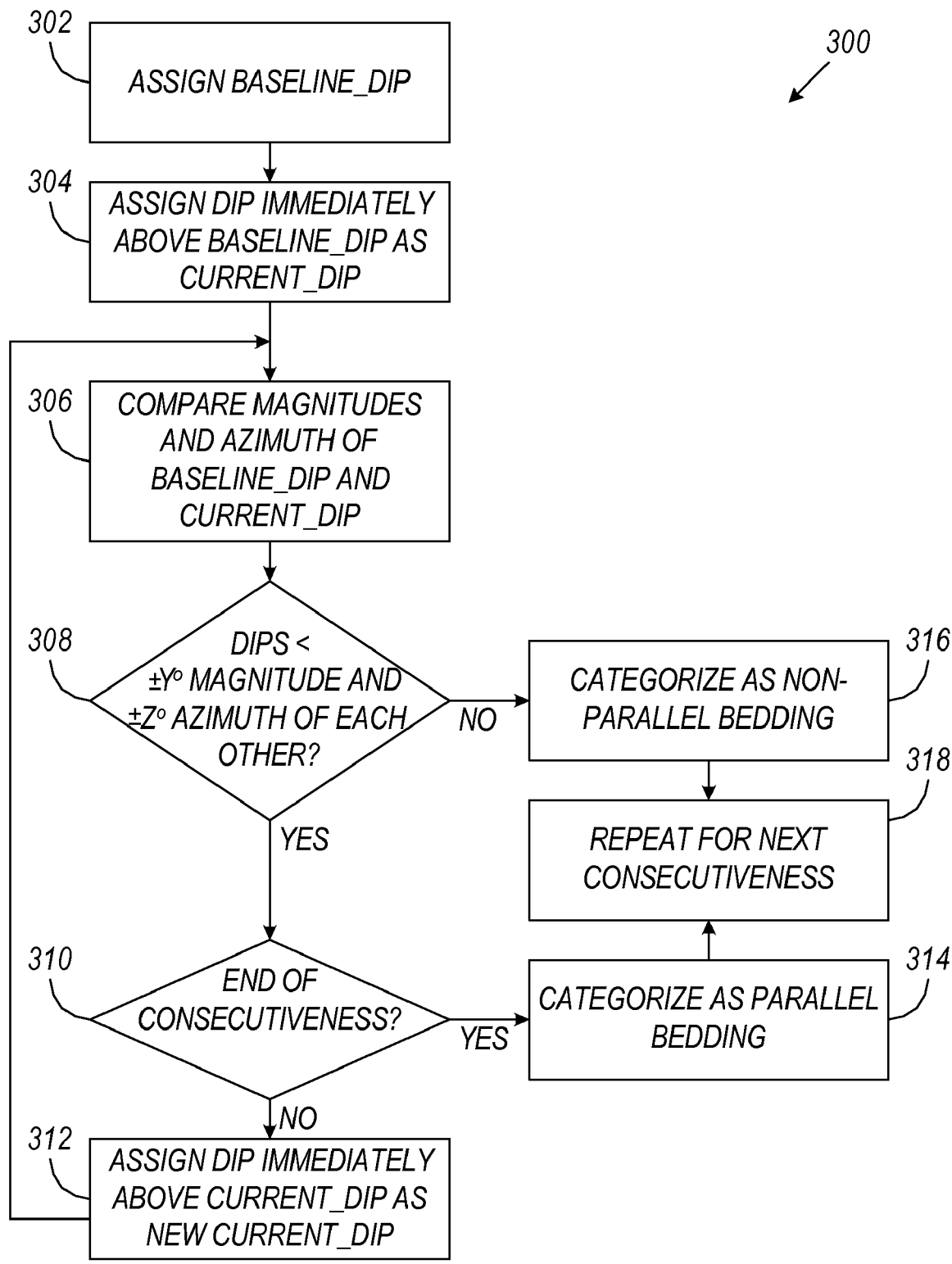
FIG. 3 illustrates an exemplary method for detecting parallel bedding according to embodiments of the invention.

Once the occurrences of consecutiveness have been identified, the dip trend interpretation module 112 uses that information to identify other geological events. In one embodiment, the dip trend interpretation module 112 may use the consecutiveness information to identify parallel bedding. Parallel bedding, as understood by those having ordinary skill in the art, refers to a phenomenon where the dips are essentially parallel to one another within a certain number of degrees of magnitude and of azimuth. FIG. 3 illustrates an exemplary method 300 that may be used by the dip trend interpretation module 112 to identify parallel bedding.

As shown in FIG. 3, the method 300 begins at step 302, where "baseline_dip" for the particular set of "consecutive" dips (as determined above) under consideration is taken, for example, from method 200, step 212 (see FIG. 2). The dip that is immediately above "baseline_dip" is then assigned as "current_dip" at step 304, and a comparison of the two dip values, including magnitudes and azimuths, is made at step 306. At step 308, a determination is made as to whether the dips are within a certain number of degrees of magnitude and of azimuth, for example, "Y" degrees of magnitude and "Z" degrees of azimuth, of each other. The values of "Y" and "Z" may be selected by the geoscientist/user as appropriate. If the dips are within "Y" degrees of magnitude and "Z" degrees of azimuth of each other, then a determination is made at step 310 as to whether the consecutiveness has ended. If the consecutiveness has not ended, then at step 312, the dip immediately above "current_dip" is assigned as the new "current_dip". The method 300 thereafter returns to step 306, where the magnitude and azimuth angles of the new "current_dip" are compared to those of "baseline_dip."

However, if the end of consecutiveness is reached in step 310 and all dips are determined to be within "Y" degrees of magnitude and "Z" degrees of azimuth of "baseline_dip," then that set of dips currently under consideration is categorized as having parallel bedding at step 314, and an appropriate notation is provided on the display 116 (see FIG. 1). On the other hand, if it is ever determined at step 308 that a dip is not within "Y" degrees of magnitude and "Z" degrees of azimuth of "baseline_dip," then the set of dips being considered is categorized as having non-parallel bedding at step 316. Either case, however, will result in conclusion of the procedure for the current set of dips, after which the method 300 may be repeated for the next set of dips having consecutiveness, indicated generally here at step 318. Optionally, the method 300 may branch out (not expressly shown) after step 316 to check for other interpretations using the methods outlined, for example, in FIGS. 4 and 5.

Figure 4:
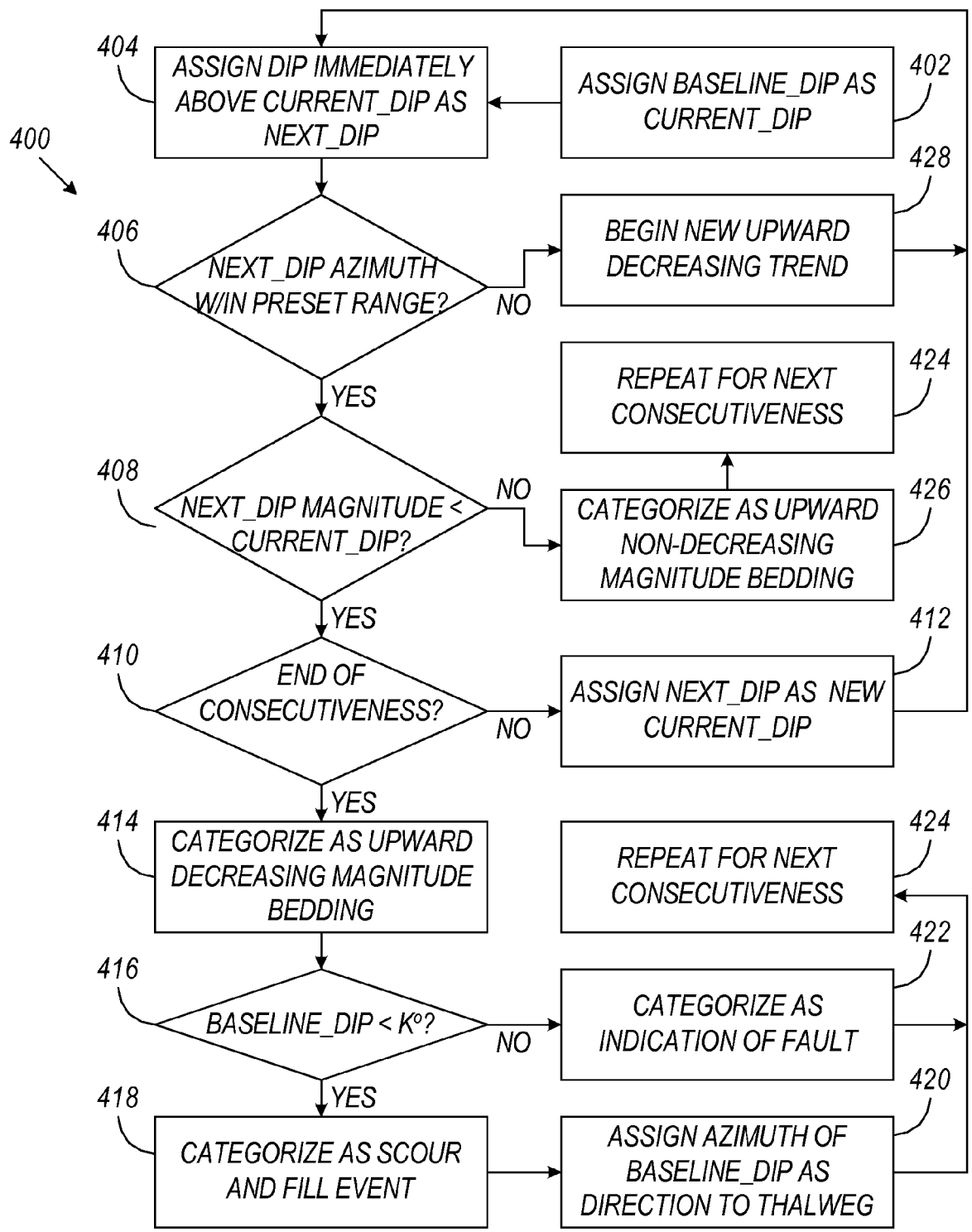
FIG. 4 illustrates an exemplary method for detecting upward decreasing magnitude bedding according to embodiments of the invention.

In addition to parallel bedding, the dip trend interpretation module 112 may also use the consecutiveness information to identify upward decreasing magnitude bedding. Upward decreasing magnitude bedding, as that term is used by those having ordinary skill in the art, refers to a phenomenon in which the "consecutive" dips going up a borehole (i.e., upsection) have progressively smaller dip magnitudes while the azimuths remain within a user-defined consistent range of azimuths. FIG. 4 illustrates an exemplary method 400 that may be used by the dip trend interpretation module 112 to identify upward decreasing magnitude bedding.

As can be seen in FIG. 4, the method 400 begins at step 402, where a baseline dip, such as "baseline_dip" from method 200, step 212 (see FIG. 2), for the particular consecutiveness under consideration is assigned as "current_dip." The dip that is immediately above "baseline_dip" is then assigned as "next_dip" at step 404. At step 406, a determination is made as to whether the azimuth of "next_dip" is within a user-defined range of the azimuth of "baseline_dip." If the azimuth of "next_dip" is outside the user-defined range, then a new upward decreasing trend is started at step 428. If the azimuth of "next_dip" is within the user-defined range of the azimuth of "baseline_dip", then at step 408, a determination is made as to whether the magnitude of "next_dip" is less than the magnitude of "current_dip." It is also possible, of course, to reverse the order of the two determination steps 406 and 408 above without departing from the scope of the invention.

If the magnitude of "next_dip" is found to be less than that of "current_dip," then a determination is made at step 410 as to whether the consecutiveness has ended. If the consecutiveness has not ended, then at step 412, "next_dip" is assigned as the new "current_dip." The method 400 returns to step 404, where the dip immediately above the new "current_dip" is assigned as the new "next_dip," and the procedure is repeated using the new "current_dip" and "next_dip."

On the other hand, if it is determined at step 410 that the consecutiveness has ended, then at step 414, the set of dips currently under consideration is categorized as having upward decreasing magnitude bedding. Although not shown, the method 400 may optionally branch out at this point to check for other interpretations using the methods outlined, for example, in FIGS. 3 and 5.

A determination is then made at step 416 as to whether the inclination of "baseline_dip" is less than a certain degree, for example, "K" degrees where "K" is the angle of repose for sediment and may be chosen by the geoscientist/user as needed. If the determination in step 416 results in a positive outcome (i.e., the magnitude of "baseline_dip" is less than "K" degrees), then the set of dips under consideration is categorized as a "scour and fill" event. A scour and fill event is generally understood as referring to a phenomenon in which a portion of a layer is eroded or otherwise carried away by a flowing body of water and subsequent layers fill in the removed portion. An appropriate notation is then provided on the display 116 for these dips. At step 420, the azimuth of "baseline_dip" is assigned as the direction to thalweg of the flowing body of water and is also noted on the display 116, after which the method 400 proceeds to step 424, where the procedure is repeated for the next set of dips having consecutiveness.

Alternatively, if the determination at step 416 results in a negative outcome (i.e., the magnitude of "baseline_dip" is greater than "K" degrees), then at step 422, the set of dips under consideration is categorized as an indication of fault. An appropriate notation is again provided on the display 116, after which the method 400 again proceeds to step 424 to repeat the procedure for the next set of dips having consecutiveness.

If it is observed at any time during the determination at step 408 that the magnitude of "next_dip" is not less than the magnitude of "current_dip," then the set of dips currently under consideration is categorized as having upward non-decreasing magnitude bedding at step 426. The method 400 proceeds to step 424 to repeat the procedure for the next set of dips having consecutiveness. Optionally, the method 400 may branch out from this point to check for other interpretations using the methods outlined, for example, in FIGS. 3 and 5.

Figure 5:
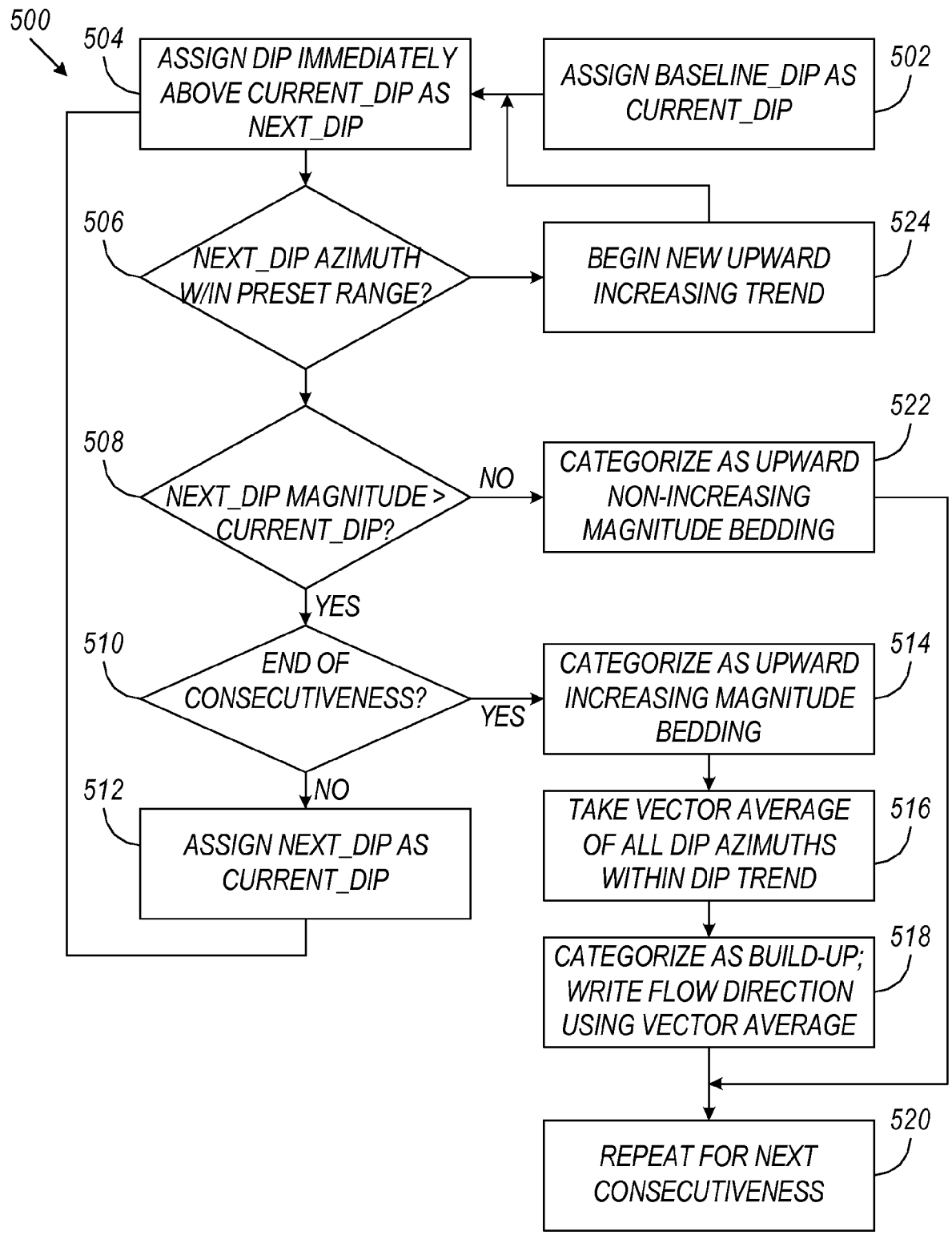
FIG. 5 illustrates an exemplary method for detecting upward increasing magnitude bedding according to embodiments of the invention.

In addition to upward decreasing magnitude bedding, the dip trend interpretation module 112 may also be configured to use the consecutiveness information to identify upward increasing magnitude bedding. Upward increasing magnitude bedding, as understood by those having ordinary skill in the art, refers to a phenomenon in which the dips going upsection have progressively larger magnitudes while the azimuths remain within a user-defined consistent range of azimuths. FIG. 5 illustrates an exemplary method 500 that may be used by the dip trend interpretation module 112 to identify upward increasing magnitude bedding.

As shown in FIG. 5, the method 500 begins at step 502, where a baseline dip, such as "baseline_dip" from method 200, step 212 (see FIG. 2), for the set of consecutive dips under consideration is assigned as "current_dip." The dip that is immediately above "current_dip" is then assigned as "next_dip" at step 504. At step 506, a determination is made as to whether the azimuth of "next_dip" is within a user-defined range of the azimuth of "baseline_dip." If the azimuth of "next_dip" is outside the user-defined range of the azimuth of "baseline_dip," then a new upward increasing trend is started at step 524. If the azimuth of "next_dip" is within the user-defined range of the azimuth of "baseline_dip," then at step 508, a determination is made as to whether the magnitude of "next_dip" is greater than the magnitude of "current_dip." Those having ordinary skill in the art will recognize that the two determination steps 506 and 508 above may also be performed in reverse order without departing from the scope of the invention.

If the magnitude of "next_dip" is found to be greater than that of "current_dip," then a determination is made at step 510 as to whether the consecutiveness has ended. If the consecutiveness has not ended, then at step 512, "next_dip" is assigned as "current_dip" and the method 500 returns to step 504, where the dip immediately above the new "current_dip" is assigned as the new "next_dip" and the procedure is repeated using the new "current_dip" and the new "next_dip."

On the other hand, if it is determined at step 510 that the consecutiveness has ended, then at step 514, the set of dips currently under consideration is categorized as having upward increasing magnitude bedding. In addition, at step 516, a vector average of the azimuths is taken for all the consecutive dips currently under consideration in accordance with techniques well known to those having ordinary skill in the art. This vector average information is subsequently used in step 518, where the dips are categorized as a "build up" event, to provide the flow direction for the bedding. A build-up event, as understood by those having ordinary skill in the art, refers to a phenomenon in which layers of sediment are deposited one over another (with increasing dip magnitude) without any or with minimal erosion. An appropriate notation is then provided on the display 116 for these dips.

If it is observed at any time during the determination at step 508 that the magnitude of "next_dip" is not greater than the magnitude of "current_dip," then the set of dips currently under consideration is categorized as having upward non-increasing magnitude bedding at step 522. The method 500 proceeds to step 520 to repeat the procedure for the next set of dips having consecutiveness.

Although the methods 300, 400, and 500 of FIGS. 3, 4, and 5, respectively, were described in sequential order, it should be clear that each of these methods may be performed independently of the other methods, and that one or more of the methods may be skipped entirely without affecting the other methods. In addition, although in the embodiments described above, all occurrences of dip consecutiveness were identified first before the geological events of interest were identified, it is possible to identify the geological events of interest as soon as each occurrence of consecutiveness is identified rather than waiting for all occurrences of consecutiveness to be identified. Moreover, although the set of dips having consecutiveness are generally analyzed from the bottommost set to the topmost set, it is also possible to analyze the sets out of turn (i.e., in no particular order) without departing from the scope of the invention. Finally, although multiple discrete steps were described in FIGS. 2-5, those having ordinary skill in the art will understand that two or more steps may be combined into a single step, and that a single step may be divided into several sub-steps as needed. The foregoing comments also apply to the methods of FIGS. 8 and 9 that are described later herein. Regardless of the particular order or sequence any of the embodiments of the invention are performed, it should be clear that these embodiments will save geoscientists/users a tremendous amount of time over existing techniques.

Once the dip trend interpretations and the identification of the geological events of interest (see FIGS. 3-5) are completed, this information may be presented via the display 116. In one embodiment, the display 116 may provide an integrated presentation where the various tracks of data may be shown alongside the dips and the annotations. Such an integrated presentation may be generated using a number of well known software applications specifically designed for that purpose, including the Boreview™ software available from Schlumberger Oilfield Services, Inc. An example of an integrated presentation 600 generated using Boreview™ is illustrated in FIG. 6.

Figure 6:
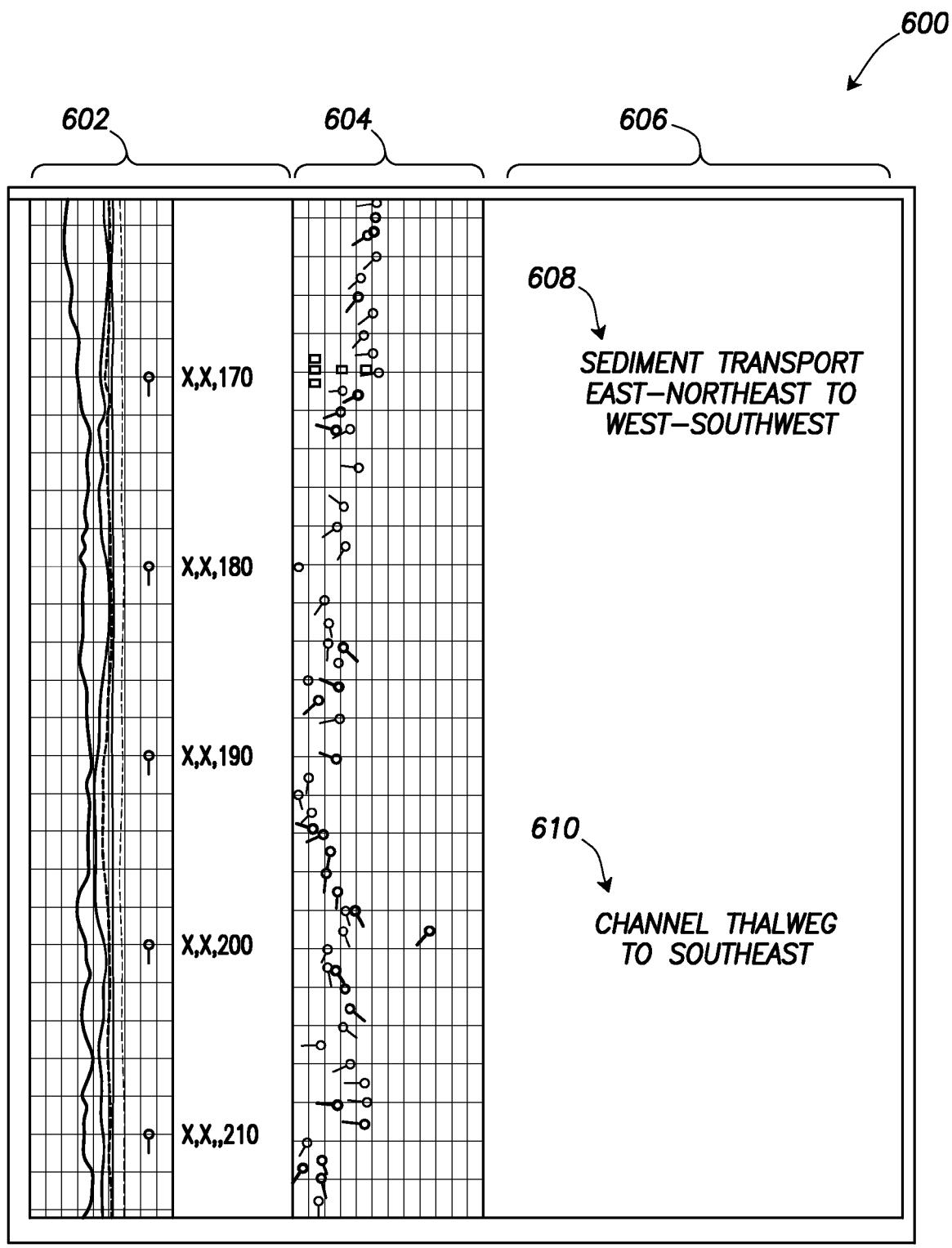
FIG. 6 illustrates a portion of an exemplary presentation showing the dip trend interpretations according to embodiments of the invention.

As can be seen in FIG. 6, the exemplary integrated presentation 600 shows a track 602 for the correlation curves (along with the depth indicators therefor) next to another track 604 for the corresponding dips. The tracks of data 602 and 604 are believed to be well understood by those having ordinary skill in the art and therefore will not be described herein. Note that the dips are shown here using the industry standard markers for dips. Other tracks for other types of data may of course be added to (or removed from) the integrated presentation 600 as needed without departing from the scope of the invention.

The annotations for the dip trend interpretations are then shown in yet another track 606, with the individual annotations 608 and 610 provided adjacent to the set of dips to which they correspond. The particular types of annotations as well as the specific language for each annotation may be customized by the geoscientist/user as needed and, thus, no pre-defined set of annotations is provided herein. In some embodiments, the set of annotations may be stored in the dip trend interpretation module 112 itself, or in a look-up table that can be accessed by the dip trend interpretation module 112 according to the results of the methods 200, 300, 400, and 500 of FIGS. 2, 3, 4, and 5, respectively.

In the present example, the first annotation 608 states that sediment is being transported from the east-northeast (ENE) to the west-southwest (WSW) for the respective set of dips as identified, for example, by the build-up determination at step 518 (see FIG. 5). The second annotations 610 indicates that the thalweg of the flow (e.g. channel) is to the southeast (SE) as identified, for example, by the scour and fill determination at step 418 (see FIG. 4).

In addition to the dip trend interpretations, embodiments of the invention may also provide a computer-based method and system for automatically identifying and analyzing depositional events. In these embodiments, the system/method of the invention may use mineral based lithofacies data derived from elemental capture spectroscopy (ECS™), oil-based mud imager/fullbore formation micro imager (OBMI™/FMI™), and/or other similar tools to identify and analyze depositional events. In addition to the dip trend interpretations, embodiments of the invention may also provide a computer-method and system for automatically identifying and analyzing depositional events. This part of the invention is optional, however. If its results are desired then an input of mineral-based lithofacies data derived from ECS™, OBMI™/FMI™, and/or other similar tools would be required. Following is a description of an exemplary implementation of the depositional events embodiment of the invention.

Figure 7:
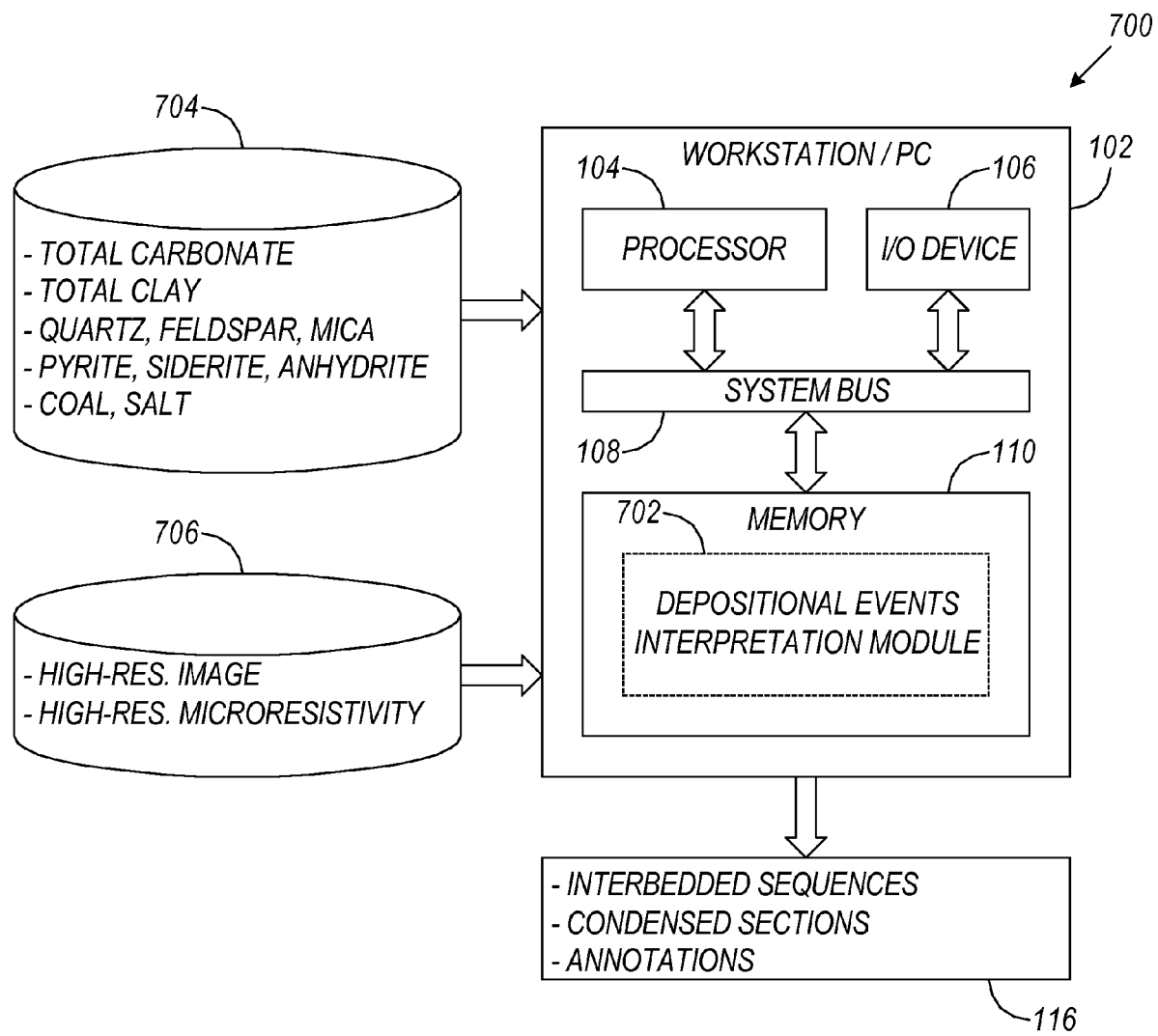
FIG. 7 illustrates an exemplary system that may be used to detect interbedded sequences and condensed sections according to embodiments of the invention.

Referring now to FIG. 7, a system 700 is shown for automatically identifying and analyzing depositional events. The system 700 is similar to the system 100 of FIG. 1 in that it includes, among other things, a workstation 102 having at least one processor 104, an input/output (I/O) unit 106, a system bus 108, and a system memory 110. For a discussion on the functions of these components, the reader is referred to the description accompanying FIG. 1 above. The main difference between the two systems 700 and 100 is that in addition to (or instead of) the dip interpretation module 112, the system memory 110 has stored thereon a depositional events interpretation module 702.

The depositional events interpretation module 702, in accordance with embodiments of the invention, is configured to identify, for example, interbedded sequences, condensed sections, and other depositional events. The depositional events interpretation module 702 uses mineral based lithofacies data obtained, for example, from the output data of the ECS™ and OBMI™/FMI™ tools to identify the depositional events. Examples of the processed output data of the ECS™ tool with processing software include the dry weight percentages of the total carbonate of a formation, the total clay, the QFM (quartz, feldspar, mica), the pyrite, siderite, anhydrite, and the coal and the salt content. Once acquired and processed, this output data may be stored in a database 704 for subsequent upload to the workstation 102. Examples of the type of data that may be acquired from the OBMI™/FMI™ tool include a high-resolution image of the borehole and a high-resolution micro-resistivity for the borehole. The data from the tool OBMI™/FMI™, once acquired, may be stored in another database 706 for subsequent upload to the workstation 102.

After the data from the ECS™ and OBMI™/FMI™ tools have been uploaded to the workstation 102 from the databases 704 and 706, the workstation 102 converts the uploaded data into lithofacies data. For information regarding this conversion process, the reader is referred to the iCore™ rock classification system described in commonly assigned U.S. Pat. No. 6,751,557 mentioned above. In one embodiment, the workstation 102 has software stored thereon that functions in a similar or identical manner to the iCore™ rock classification system. Upon receiving the data from the ECS™ and OBMI™/FMI™ tools and some user inputs, the workstation 102 executes this software to convert the uploaded data into lithofacies data. The depositional events interpretation module 702 may then use the lithofacies data to identify and analyze the various depositional events.

Figure 8:
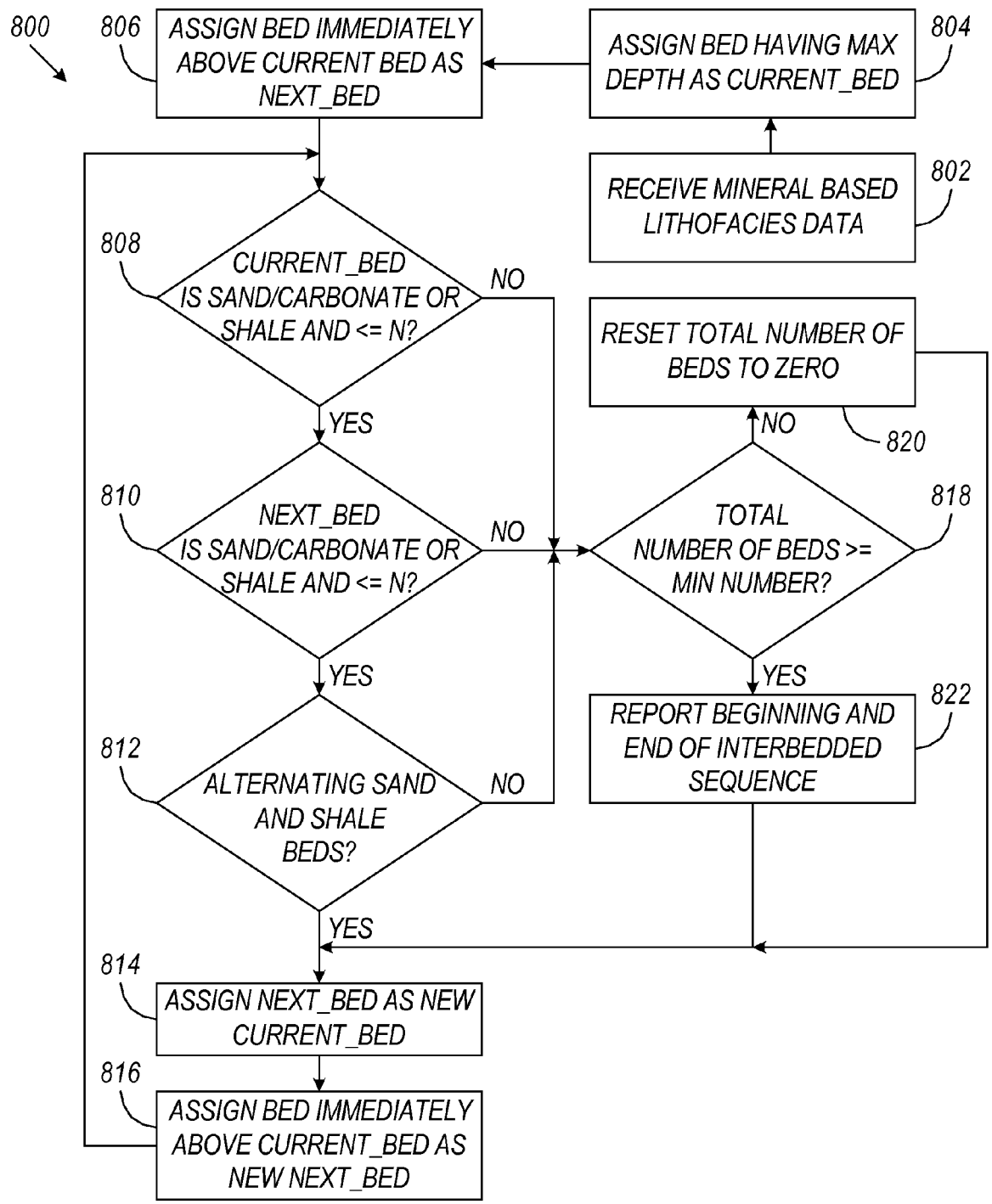
FIG. 8 illustrates an exemplary method for detecting interbedded sequences according to embodiments of the invention.

FIG. 8 illustrates an exemplary method 800 that the depositional events interpretation module 702 may use to identify a particular depositional event, namely, interbedded sequences. An "interbedded sequence," as understood by those having ordinary skill in the art, refers to an alternating sequence of shale (or clay-dominated rock) beds and sand (or quartz-rich rock) or carbonate (or calcium-rich rock) beds. To determine whether there is an interbedded sequence, two parameters must be specified by the geoscientist/user beforehand: (1) the maximum thickness of any one of the beds, and (2) the minimum number of beds that need to be present in order for the sequence to be called an interbedded sequence.

As can be seen in FIG. 8, the method 800 begins at step 802, where mineral based lithofacies data is read or otherwise received, for example, from the iCore™ rock classification system or other similar systems. Beginning at the bottom of the data (i.e., deepest data first), the bed having the maximum depth is assigned as the current bed, denoted herein by the variable "current_bed," at step 804. The bed immediately above "current_bed" moving uphole is assigned as "next_bed" at step 806. At step 808, a determination is made as to whether "current_bed" is either sand/carbonate or shale and also less than or equal to a user specified maximum thickness (e.g., "N" inches). If the answer is yes, then at step 810, a determination is made as to whether "next_bed" is either sand/carbonate or shale and also less than or equal to the same maximum thickness. If the answer is again yes, then a determination is made at step 812 as to whether "current_bed" and "next_bed" are alternating shale (or clay-dominated rock) beds and sand (or quartz-rich rock) or carbonate (or calcium-rich rock) beds. If the answer is once more yes, then "next_bed" is assigned as the new "current_bed" at step 814, and the bed immediately above the new "current_bed" is assigned as the new "next_bed" at step 816. The method 800 thereafter returns to step 808 to check the new "current_bed" and new "next_bed."

If any of the determinations performed in steps 808, 810, and 812 results in an answer of no, then a determination is made at step 818 as to whether the total number of beds accumulated in the interbedded sequence thus far is greater than or equal to a minimum number of beds. As mentioned above, the minimum number of beds may be specified by the geoscientist/user as needed. If the answer to the determination at step 818 is yes, then the beginning and the end of the current interbedded sequence are noted and reported (e.g., on a display 116). On the other hand, if the answer to the determination at step 818 is no, then the total number of beds accumulated in the interpolated sequence is reset (i.e., set to zero). The method 800 thereafter proceeds to step 814 to continue the process with the next set of beds moving uphole.

Figure 9:
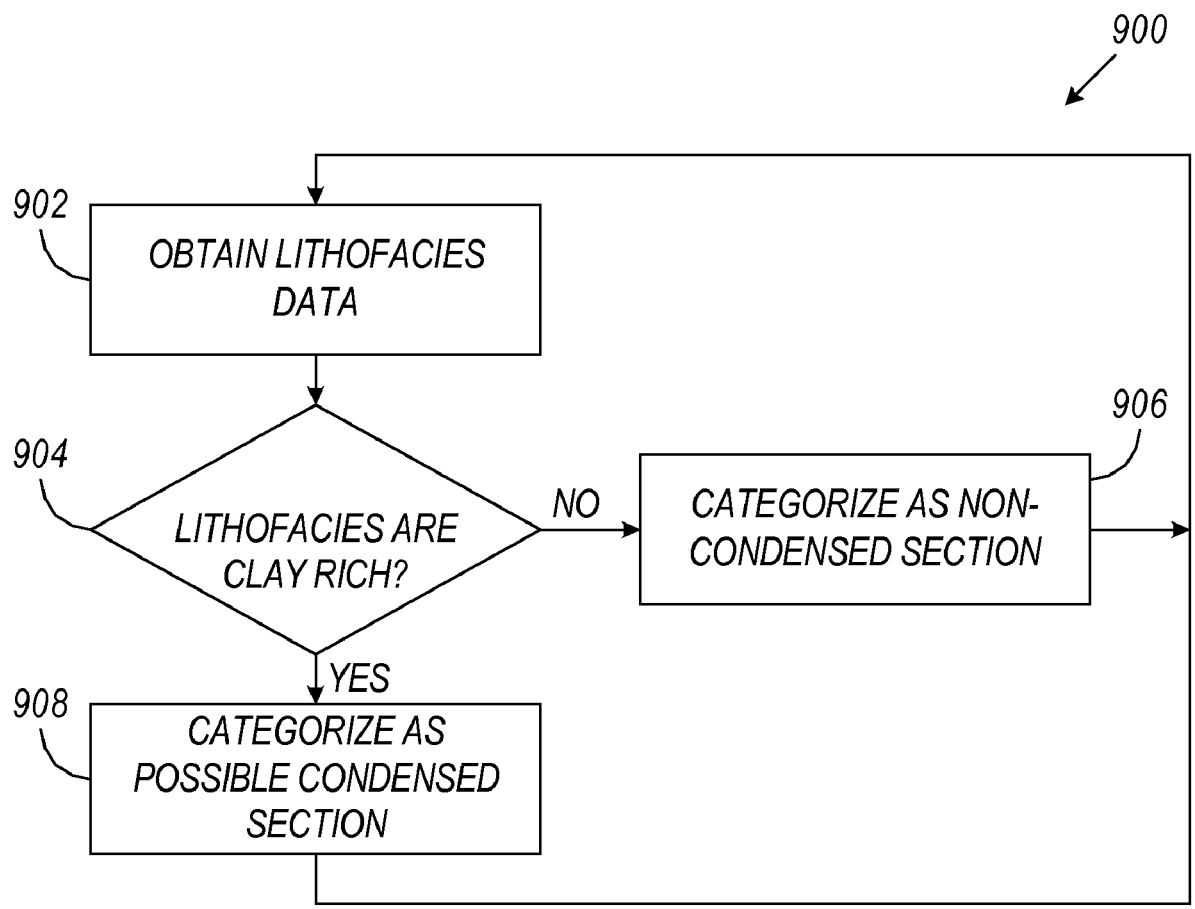
FIG. 9 illustrates an exemplary method for detecting condensed sections according to embodiments of the invention.

In addition to the interbedded sequences, the depositional events interpretation module 702 may also use the lithofacies data to identify possible condensed sections. This embodiment of the invention is illustrated in FIG. 9. As can be seen, a method 900 for identifying possible condensed sections begins at step 902 with the depositional events interpretation module 702 obtaining lithofacies data. At step 904, the depositional events interpretation module 702 makes a determination as to whether the lithofacies data for a particular depth under consideration indicates high clay content (e.g., claystone content). If the determination is negative, then the lithofacies under consideration are categorized as a non-condensed section at step 906, and an appropriate notation may or may not be provided on the display 116. On the other hand, if the determination is positive, then the lithofacies under consideration are categorized as a possible condensed section, and an appropriate notation may likewise be provided on the display 116.

After a determination of either a non-condensed section or possible condensed section has been reached, the method 900 returns to step 902, where the procedure is repeated for next lithofacies.

Upon completion of the identification of the interbedded sequence (see FIG. 8) and/or the possible condensed section (see FIG. 9), this information may again be presented to the geoscientist/user via the display 116. As with the previous embodiments, the display 116 may provide an integrated presentation where the various tracks of data may be shown alongside the dips and the annotations. Such an integrated presentation, again, may be generated using a number of well known software applications specifically designed for that purpose, including the BorView™ software available from Schlumberger Oilfield Services, Inc. An example of an integrated presentation 1000 generated using BorView™ is illustrated in FIG. 10.

As can be seen in FIG. 10, the exemplary integrated presentation 1000 has a track 1002 for the lithofacies of the formation in the borehole and another track 1004 for the static borehole image. Also present is a third track 1006 for showing the true dips (selected by the geoscientist/user) and a fourth track 1008 for showing the dynamic borehole image. A fifth track 1010 shows the structure deleted dips, which are identified again using industry standard markers for dips. These tracks of data are believed to be well understood by those having ordinary skill in the art and therefore need not be described herein. Other tracks for other types of data may also be added to (or removed from) the integrated presentation 1000 as needed without departing from the scope of the invention.

The annotations for the dip trend and lithofacies interpretations are then shown in a sixth track 1012, with the individual annotations 1014 and 1016 provided adjacent to the geological events which they correspond. The first annotation 1014 indicates that there is a possible condensed section starting at a first depth, and the second annotation 1016 indicates that there is an interbedded section starting at a second depth. As in previous embodiments, the particular types of annotations as well as the specific language for each annotation may be customized by the geoscientist/user as needed and, thus, no predefined set of annotations is provided herein. In one example, the set of annotations may be stored in the depositional events interpretation module 702 itself or in a look-up table that can be accessed by the depositional events interpretation module 702 according to the results of the methods 800 and 900 of FIGS. 8 and 9, respectively.

While the present invention has been described with reference to one or more particular embodiments, those skilled in the art will recognize that many changes may be made thereto without departing from the spirit and scope of the invention. Therefore, each of the foregoing embodiments and obvious variations thereof is contemplated as falling within the spirit and scope of the claimed invention, which is set forth in the following claims.

What is claimed is:

1. A computer-based method for processing a plurality of dips in a portion of a subsurface formation, comprising:
   receiving a consecutiveness threshold to be applied to the dips;
   determining, using a processor of a computer system, whether the dips have consecutiveness based on the consecutiveness threshold;
   identifying and analyzing, using the processor, one or more geological events from the dips having consecutiveness, wherein the one or more identified geological events include upward decreasing magnitude bedding, flow direction, scour and fill event, indication of fault, and direction to thalweg;
   determining, using the processor, a maximum dip magnitude and using an azimuth of whichever dip has the maximum dip magnitude to identify the direction to thalweg; and
   displaying dip trend information for the dips having consecutiveness based on the identified geological events.

2. The method according to claim 1, further comprising displaying the dip trend information alongside the dips in an integrated presentation format.

3. The method according to claim 1, wherein the dips are at unevenly spaced depth intervals resulting in an irregular data sampling rate, further comprising increasing the data sampling rate to conform the irregular data sampling rate to a regular data sampling rate.

4. The method according to claim 1, wherein the dips include structure deleted dips.

5. The method according to claim 1, wherein the one or more identified geological events further include parallel bedding.

6. The method according to claim 1, wherein the one or more identified geological events further include upward increasing magnitude bedding and build up.

7. The method according to claim 6, further comprising taking a vector average of all dip azimuths having upward increasing magnitude bedding within a given consecutiveness to determine the flow direction.

8. The method according to claim 1, further comprising receiving mineral based lithofacies data, and identifying and analyzing one or more depositional events from the mineral based lithofacies data.

9. The method according to claim 8, wherein the identified depositional events include an interbedded sequence and a possible condensed section.

10. A computer-readable storage medium encoded with instructions for causing a computer to process a plurality of dips in a portion of a subsurface formation by:
    receiving a consecutiveness threshold to be applied to the dips;
    determining whether the dips have consecutiveness based on the consecutiveness threshold;
    identifying and analyzing one or more geological events from the dips having consecutiveness, wherein the one or more identified geological events include upward decreasing magnitude bedding, flow direction, scour and fill event, indication of fault, and direction to thalweg;
    determining a maximum dip magnitude and using an azimuth of whichever dip has the maximum dip magnitude to identify the direction to thalweg; and
    displaying dip trend information for the dips having consecutiveness based on the identified geological events.

11. A computer-based system for processing a plurality of dips in a portion of a subsurface formation, comprising:
    a processor;
    a system bus connected to the processor;
    a storage medium connected to the system bus, the storage medium having computer-readable instructions stored thereon for causing the processor to:
    receive a consecutiveness threshold to be applied to the dips;
    determine whether the dips have consecutiveness based on the consecutiveness threshold;
    identify and analyze one or more geological events from the dips having consecutiveness, wherein the one or more identified geological events include upward decreasing magnitude bedding, flow direction, scour and fill event, indication of fault, and direction to thalweg;
    determine a maximum dip magnitude and use the maximum dip magnitude to determine the direction to thalweg; and
    generate dip trend information for the dips having consecutiveness based on the identified geological events.

12. The system according to claim 11, further comprising a database for storing depth, inclination, and azimuth data for the dips, the depth data resulting in an irregular data sampling rate, the computer-readable instructions further causing the processor to conform the irregular data sampling rate to a regular data sampling rate by increasing the data sampling rate.

13. The system according to claim 11, wherein the one or more geological events of interest further include parallel bedding.

14. The system according to claim 11, wherein the one or more identified geological events further include upward increasing magnitude bedding and build up.

15. The system according to claim 14, wherein the computer-readable instructions further cause the processor to take a vector average of all dip azimuths having upward increasing magnitude bedding within a given consecutiveness to determine the flow direction.

16. The system according to claim 11, wherein the computer-readable instructions further cause the processor to receive mineral based lithofacies data, and identify and analyze one or more depositional events from the mineral based lithofacies data.

17. The system according to claim 11, wherein the identified depositional events include an interbedded sequence and a possible condensed section.

18. A computer-based method for processing geological data in a portion of a subsurface formation, comprising the steps of:

receiving data representing a plurality of dips;
receiving a consecutiveness threshold to be applied to the plurality of dips;
determining, using a processor of a computer system, whether the dips have consecutiveness based on the consecutiveness threshold;
identifying and analyzing, using the processor, one or more geological events from the dips having consecutiveness, the geological events including at least one of upward decreasing magnitude bedding, upward increasing magnitude bedding, flow direction, scour and fill event, indication of fault, and direction to thalweg;
receiving mineral based lithofacies data;
identifying and analyzing, using the processor, one or more depositional events from the mineral based lithofacies data, the depositional events including at least one of an interbedded sequence and a possible condensed section;
determining, using the processor, a maximum dip magnitude and using an azimuth of whichever dip has the maximum dip magnitude to identify the direction to thalweg; and
displaying dip trend information for the dips based on the identified geological events and depositional events.

* * * * *